(12) United States Patent
Aikawa et al.

(10) Patent No.: US 6,270,413 B1
(45) Date of Patent: *Aug. 7, 2001

(54) DISPLAY METHOD FOR GAMES DISPLAYS

(75) Inventors: Yoshimi Aikawa; Kazunari Tsukamoto; Hirokuni Hosokawa, all of Tokyo (JP)

(73) Assignee: Sega Enterprises, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/886,142

(22) Filed: Jul. 3, 1997

(30) Foreign Application Priority Data

Jul. 3, 1996 (JP) .................................................. 8-173809

(51) Int. Cl.⁷ ...................................................... A63F 09/24
(52) U.S. Cl. .................................. 463/31; 463/4; 463/37; 273/317.6
(58) Field of Search ................................ 463/3, 4, 7, 37, 463/38, 31; 273/317.6, 108.31, 108.32, 460, 461

(56) References Cited

U.S. PATENT DOCUMENTS

| 4,552,360 | * | 11/1985 | Bromley et al. | 463/31 |
| 4,672,541 | * | 6/1987 | Bromley et al. | 463/31 |
| 5,714,981 | * | 2/1998 | Scott-Jackson et al. | 463/37 |
| 5,779,548 | * | 7/1998 | Asai et al. | 463/31 |
| 6,132,315 | * | 10/2000 | Miyamoto et al. | 463/43 |
| 6,139,433 | * | 10/2000 | Miyamoto et al. | 463/32 |
| 6,139,434 | * | 10/2000 | Miyamoto et al. | 463/32 |

* cited by examiner

*Primary Examiner*—Ira S. Lazarus
*Assistant Examiner*—John Paradiso
(74) *Attorney, Agent, or Firm*—Dickstein Shapiro Morin & Oshinsky LLP

(57) ABSTRACT

In a match game, game characters to be operated by game players are displayed on divided ones of a display screen at a prescribed point of time in the match game so that the respective game players make respective inputs. When the input operations of the game players are completed, motions of the game characters based on the inputs by the game players are displayed on the rejoined display screen. In a match game players can intuitionally decide operations they will make. The display method for game displays can make displays which are indicative enough to know situations of a match game.

32 Claims, 12 Drawing Sheets

DISPLAY METHOD FOR GAMES DISPLAYS

BACKGROUND OF THE INVENTION

The present invention relates to a display method for game displays of a game which is advanced based on inputs by a plurality of match game players.

As computer techniques have made progress, video game devices (image processing devices) using computer graphic techniques have been widely used. Video games which are played by match game players operating game characters in the game, and which are played by computers vs. game players are stably popular. A number of video games of these kinds have been published.

The above-described so-called match games include, e.g., baseball games, soccer games, etc. which simulate sports. In the games of these kinds, different operations are often used depending on game situations. Accordingly displays which are indicative enough of proceeding situations of a game are required.

SUMMARY OF THE INVENTION

An object of the present invention is to provide a display method for game displays of a game which can be indicative enough of proceeding situations of the game.

The method for game displays according to the present invention is characterized in that the display method for game displays in a match game comprises: the first step of dividing a display screen at a prescribed point of time of the game to individually display a game character to be operated by a game player on the display screen which is divided, and permitting the game player to make an input; and the second step of displaying a motion of the game character which is based on the input by the game player on the display screen which is rejoined, whereby game players can easily intuitionally know operations they will make in a match game.

The method for game displays according to the present invention is characterized in that the display method for game displays of a game which is advanced based on inputs by a plurality of match game players, comprises: the first step of dividing a display screen at a prescribed point of time of the game to individually display game characters to be operated by the respective match game players on the display screen which is divided, and permitting the game players to make inputs; and the second step of displaying motions of the game characters which are based on the inputs by the game players on the display screen which is rejoined, whereby in a game advanced based on inputs by a plurality of match game players, the game players can easily intuitionally know operations they will make.

In the above-described display method for game displays, it is possible that in the second step the divided display screen is rejoined after all the game players have made the inputs, which makes it easy to understand proceedings of a game.

The method for game displays according to the present invention is characterized in that the display method for game displays for displaying on a display screen an image of a virtual game space obtained at a prescribed view point, comprises: the first step of dividing the display screen at a prescribed point of time of a game to make an image of a character-to-be-operated at respective points of view on the display screen, and permitting a game player to make an input; and the second step of displaying a motion of the game character which is based on the input by the game player on the display screen which is rejoined and at one view point, whereby in a match game players can easily intuitionally decide operations they will make.

In the above-described display method for game displays, it is possible that said one view point in the second step is at a location different from that in the first step, which makes a game realistic.

In the above-described display method for game displays, it is possible that in the second step the divided display screen is rejoined after a prescribed period of time, whereby a game can be advanced without delay.

In the above-described display method for game displays, it is possible that in the second step the rejoined display screen displays all the game characters to be operated by the game players, whereby operations can be made, generally knowing situations of a game.

In the above-described display method for game displays, it is possible that in the first step, displays for the respective game players deciding operations are provided on the respective divided display screens, whereby game players can accurately decide operations they will make.

The display method for game displays according to the present invention is characterized in that the first step of dividing, when game characters to be operated by game players compete with each other, a display screen so as to display the respective game characters, and permitting the game players to make inputs; and the second step of displaying the game characters moving based on the inputs by the game players on the display screen which is rejoined, whereby very realistic images can be provided in sports games which are played one vs. one.

In the above-described display method for game displays, it is possible that in the second step all the game characters moving based on the inputs by the game players in the first step are displayed on the rejoined display screen, whereby operations can be made, generally knowing situations of a sports game.

The display method for game displays according to the present invention is characterized in that the display method for game displays of a baseball game which is advanced based on an operational signal of control means, comprises: providing two sub-screens on the game display screen; providing on one of the sub-screens a display indicating a strike zone, and a cursor display indicating a point along which a bat passes in the strike zone; and providing on the other of the sub-screens a display indicating the strike zone, and a cursor display indicating a point along which a ball passes in the strike zone, whereby in a baseball game the respective game players can be concentrated on operations they will make.

In the above-described display method for game displays, it is preferable that the method further comprises: providing a display indicating a batter character on said one of the sub-screens; and providing a display indicating a pitcher character on the other of the sub-screens, whereby in a baseball game, respective game players can easily decide operations they will make.

The display method for game displays according to the present invention is characterized in that the display method for game displays of a baseball game which is advanced based on an operational signal of control means, comprises: providing two sub-screens on a game display screen; providing a display for selecting a batting position of one of the game players and a display of a character operated by said one of the game players on one of the sub-screens; and providing a display for selecting a pitching position of the other of the game players and a display of a character operated by the other of the game players on the other of the sub-screens, whereby in a baseball game the respective game players can easily decide operations they will make, and can be concentrated on their own operations.

The display method for game displays according to the present invention is characterized in that the display method for game displays of a match game which is advanced based on an operational signal of control means, comprises: the first step of dividing a display screen to display respective information necessary for match game players to decide respective motions; the second step of the match game players standing by for decision of respective motions; and the third step of rejoining the divided display screen to display results of the motions on the display screen after the decision in the second step is all over, whereby in a match game, game players can easily intuitionally decide operations they will make.

The display method for game displays according to the present invention is characterized in that the display method for game displays of a match game which is advanced based on an operational signal of control means, comprises: providing on respective divided display screens displays for respective match game players deciding respective motions; and displaying a result of the motions based on the decisions of the respective match game players on the rejoined display screen, whereby in a match game, game players can easily intuitionally decide operations they will make.

In the above-described display method for game displays, it is possible that the respective displays provided on the divided display screen include displays of characters operated by the respective match game players, whereby in a match game, respective game players can easily decide operations they will make.

DETAILED DESCRIPTION OF THE INVENTION

Figure 1:
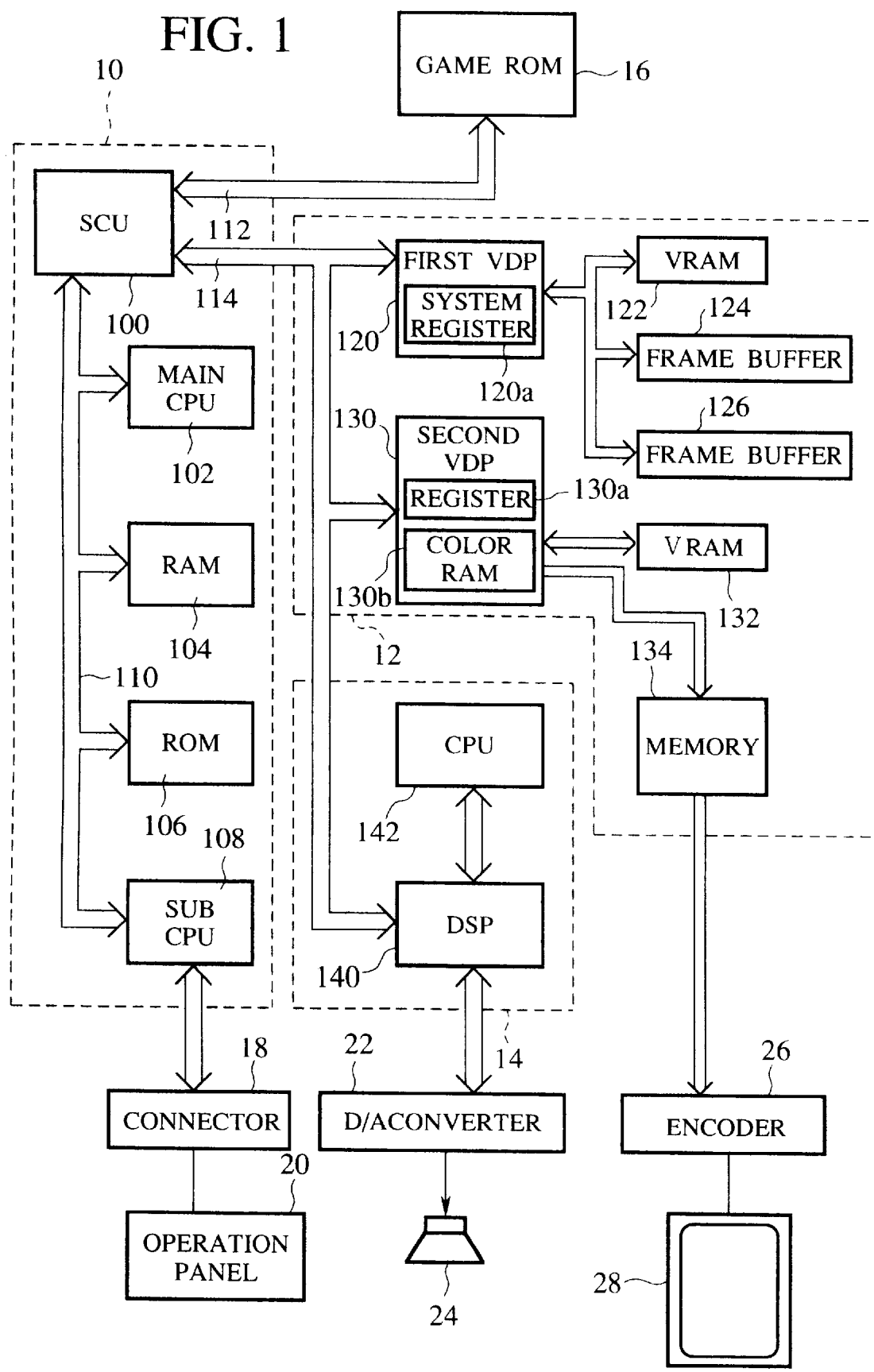
FIG. 1 is a block diagram of the game device according to a first embodiment of the present invention.
Figure 2A:
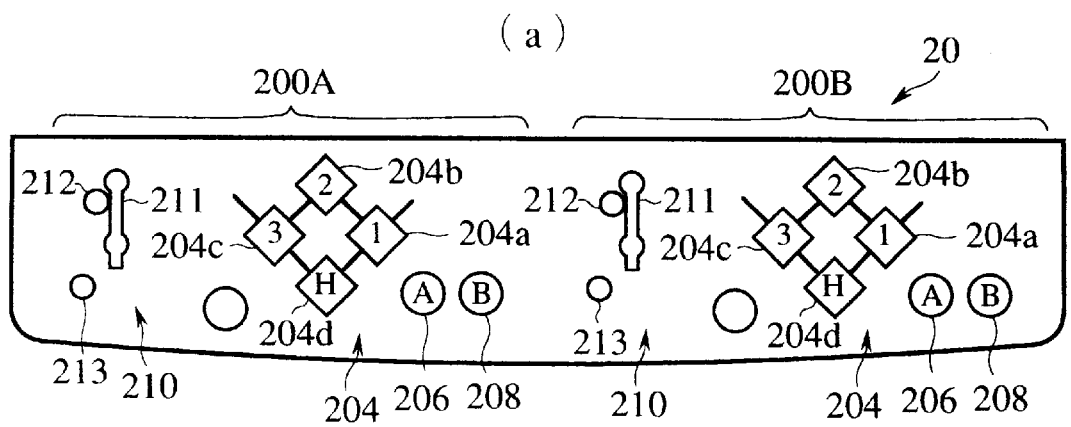
FIGS. 2A, 2B and 2C are views of an operational panel of the game device according to the first embodiment of the present invention.
Figure 2B:
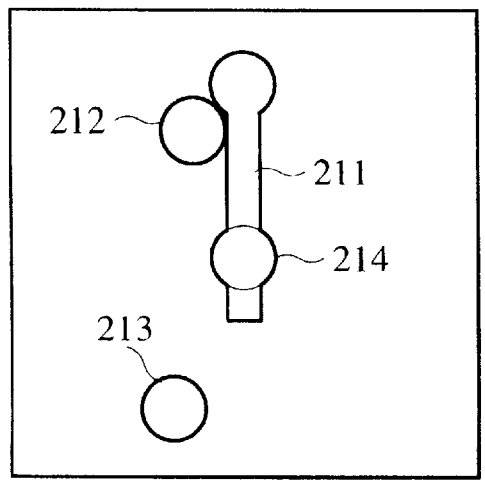
Figure 2C:
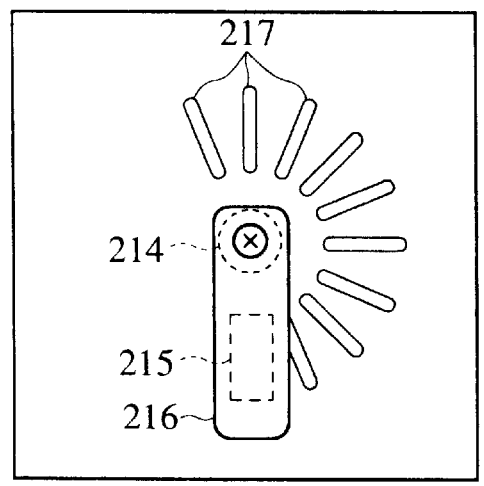

The baseball game device according to a first embodiment of the present invention will be explained with reference to FIGS. 1 to 10. FIG. 1 is a block diagram of the baseball game device according to the present embodiment. FIG. 2 is a view of controller means of the game device according to the present embodiment.

A structure of the game device according to the present embodiment will be explained with reference to FIG. 1.

The game device includes a primary control unit 10 for generally controlling the device, a display control unit 12 for controlling display of game pictures, and an audio control unit 14 or generating effective sounds.

The primary control unit 10 includes an SCU (System Control Unit) 100, a main CPU 102, a RAM 104, a ROM 106 and a sub-CPU 108 which are connected to each other by a bus 110.

The SCU 100 is connected by a bus 112 to a game ROM 16 storing a game program, and is connected to the display control unit 12 and the audio control unit 14 by a bus 114. The SCU 100 controls data input/output among the main CPU 102, VDPs 120, 130, a DSP 140 and a CPU 142 through buses 110, 112, 114.

The main CPU 102 has the same computing function incorporated as the DSP (Digital Signal Processor) and executes at high speed a game program stored in the game ROM 16.

The RAM 104 is used as a work area of the main CPU 102, and temporarily stores the game program and character data.

The ROM 106 stores a program and data common to various games, such as an initial program, etc. for initialization.

The sub-CPU 108 is connected to an operation panel 20 by a connector 18. The operation panel 20 includes operational buttons, etc. to be operated by players. The operation panel 20 will be detailed later. The sub-CPU 108 is called an SMPC (System Manager & Peripheral Control), and receives operational data from the operational panel 20 at a request of the main CPU 102 and supplies the operational data to the main CPU 102.

Based on operational data supplied by the sub-CPU 108, the main CPU 102 conducts image control, e.g., rotational transformation, perspective transformation, etc. of characters in game displays. The image control will be detailed later.

The display control unit 12 includes a first VDP 120 for drawing polygonal images of characters and backgrounds indicated by polygon data, a VRAM 122 and frame buffers 122, 124 connected to the first VDP 120, a second VDP 130 for conducting drawing background of scroll background displays, image synthesis of polygon image data and scroll image data, based on display priority, a second VDP 130 for clipping, a VRAM 132 connected to the second VDP 130, and a memory 134. The first VDP 120 and the second VDP 130 are connected to each other by a bus 114.

The first VDP 120 has a system register 120a incorporated. Polygon drawing data indicating a character is supplied to the first VDP 120 through the main CPU 102 and written in the VRAM 122. The drawing data written in the VRAM 122 is drawn in the frame buffer 122 or the frame buffer 124. The drawn data in the frame buffer 122 or the frame buffer 124 is supplied to the second VDP 130 in a display mode. Thus the two frame buffers 122, 124 are exchanged for drawing and display.

On the other hand, information for controlling drawing is set in a system register 120a of the first VDP 120 by the main CPU 102 through the SCU 100. In accordance with the control information set in the system register 120a the first VDP 230 controls drawing and display.

The second VDP 130 incorporates a register 120a and a color RAM 130b. Image data is defined in the VRAM 132 and a color RAM 130b by the main CPU 102 through the SCU 100. Information for controlling the image display is also set in the register 130a by the main CPU 102 through the SCU 106. The data defined by the VRAM 132 is read in accordance with the control information set in the register 130a of the second VDP 120 to be image data of a scroll display of a background of a character. The image data of each scroll display and polygon image data of a character supplied by the first VDP 120 are given display priority, based on control information set in the register 130a and synthesized into a final display image data.

The second VDP 130 reads color data defined in the color RAM 130b, based on display image data, and display color data is generated to be stored in a memory 134.

The display color data is stored in the memory 134 and is outputted to an encoder 26. The encoder 26 adds a synchronization signal, etc. to the image data to generate a video signal, and outputs the video signal to a monitor 28. The monitor 28 displays a game display.

The audio control unit 14 includes a DSP 140 for audio-synthesis by PCM or FM, and a CPU 142 for controlling the DSP 140. Audio data generated by the DSP 140 is converted to an audio signal by a D/A converter 22 to be outputted by a speaker 24.

The operation panel 20 includes two sets of operational buttons so that two players can play. One set of operational buttons, etc. 200A for a first player is provided on the left side of the operation panel 20, and on the right side of the operation panel 20 the other set of operational buttons etc. 200B for a second player is provided. The sets of operational buttons, etc. 200A, 200B have the same structure.

Start buttons 202 are provided respectively at the centers of the sets of operational buttons, etc. 200A, 200B. The start buttons 202 are pressed, and a game is started.

On the right sides of the start buttons 202, a diamond-layout set 204 has four base-shaped buttons 204a–204d which are arranged in a diamond. Each of the diamond-layout sets 204 includes a first base button 204a, a second base button 204b, a third base button 204c and a home base button 204d. The base-shaped buttons 204a–204d are positioned at the summits of a square with the home base button 204d positioned on the foreground as in the actual diamond. Lines are drawn between the base-shaped buttons 204a–204d as in the actual diamond.

Two decision buttons 206, 208 are provided respectively on the further right sides of the diamond-layout set 204.

On the left sides of the start buttons 202 there are provided bat-shaped switch 210 in the shape of a bat. As shown in FIGS. 2A and 2B, each bat-shaped switch 210 includes a swingable bat 211, and two stoppers 212, 213. The bat 211 is urged swingably clock-wise on a pin 214 and normally abuts on the stopper 212. When a player turns the bat 211 clock-wise against the urging force and leaves the bat 211, the bat 211 swings back counter-clockwise and blocked by the stopper 212. The stopper 213 limits the clock-wise swing of the bat 211.

A swing plate 216 with a magnet 215 secured thereto is mounted on the swing pin 214 on the backside of the bat-shaped switch 210. The swing plate 216 swings together with the bat 211. A plurality of led switches 217 are provided along a swing track of the magnet 215 secured to the swing plate 216. When the swing plate 216 is turned with the magnet 215 on the swing plate 216 sequentially coming into a prescribed range of the respective lead switches 217, the lead switches 217 are sequentially turned on, and when the swing plate 216 goes out of the prescribed range, the respective lead switches 217 are sequentially turned off.

The operation of the baseball game device according to the present embodiment will be explained with reference to FIGS. 3 and 4. FIG. 3 shows the operation of a player on the defense, and FIG. 4 shows the operation of a player on offense.

Figures 3A, 3B:
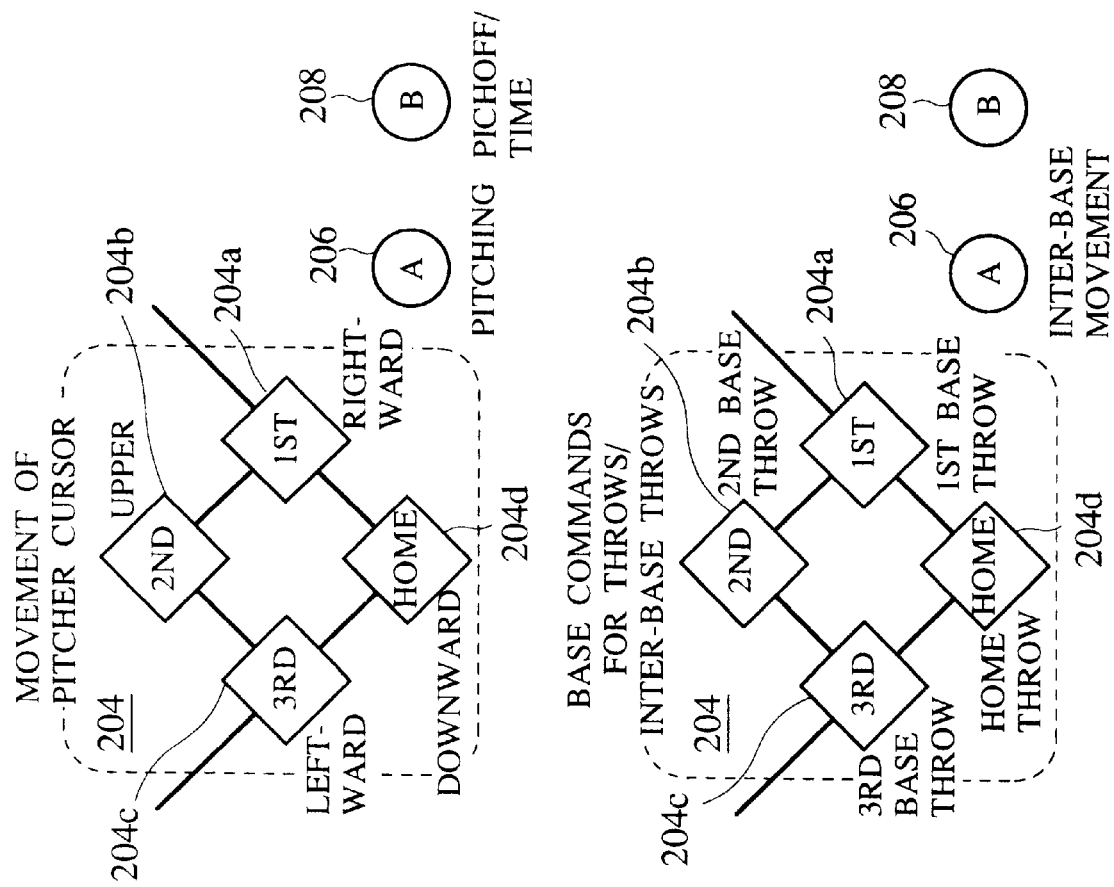
FIGS. 3A and 3B are explanatory views of operations of a player on defense in the game device according to the first embodiment of the present invention.

In pitching, as shown in FIG. 3A, the base-shaped buttons 204a–204d of the set are used as direction keys, and a pitching cursor indicating a pitching position. The first base button 204a is a rightward button, the second base button 204b is an upward button, the third button 204c is a leftward button, and the home base button 204d is a downward button. Pitching is commanded by the left decision button 206, and a pickoff/time is commanded by the left decision button 208. The bat-shaped switch 210 is not used.

On defense, as shown in FIG. 3B, a base for a throw and a base running is commanded by the set of base-shaped buttons 204. A base for a throw is directly commanded by pressing one 204a–204d of the diamond-layout set 204. For example, by pressing the third base button 204c, even when a game display is changed from a display as viewed on the catcher side to a display as viewed on the field side, a command of a throw to the third base is made. An intuitional command is thus possible irrespective of a display. A pitching is commanded by the left decision button 206. The bat-shaped switch 210 is not used.

Figures 4A, 4B:
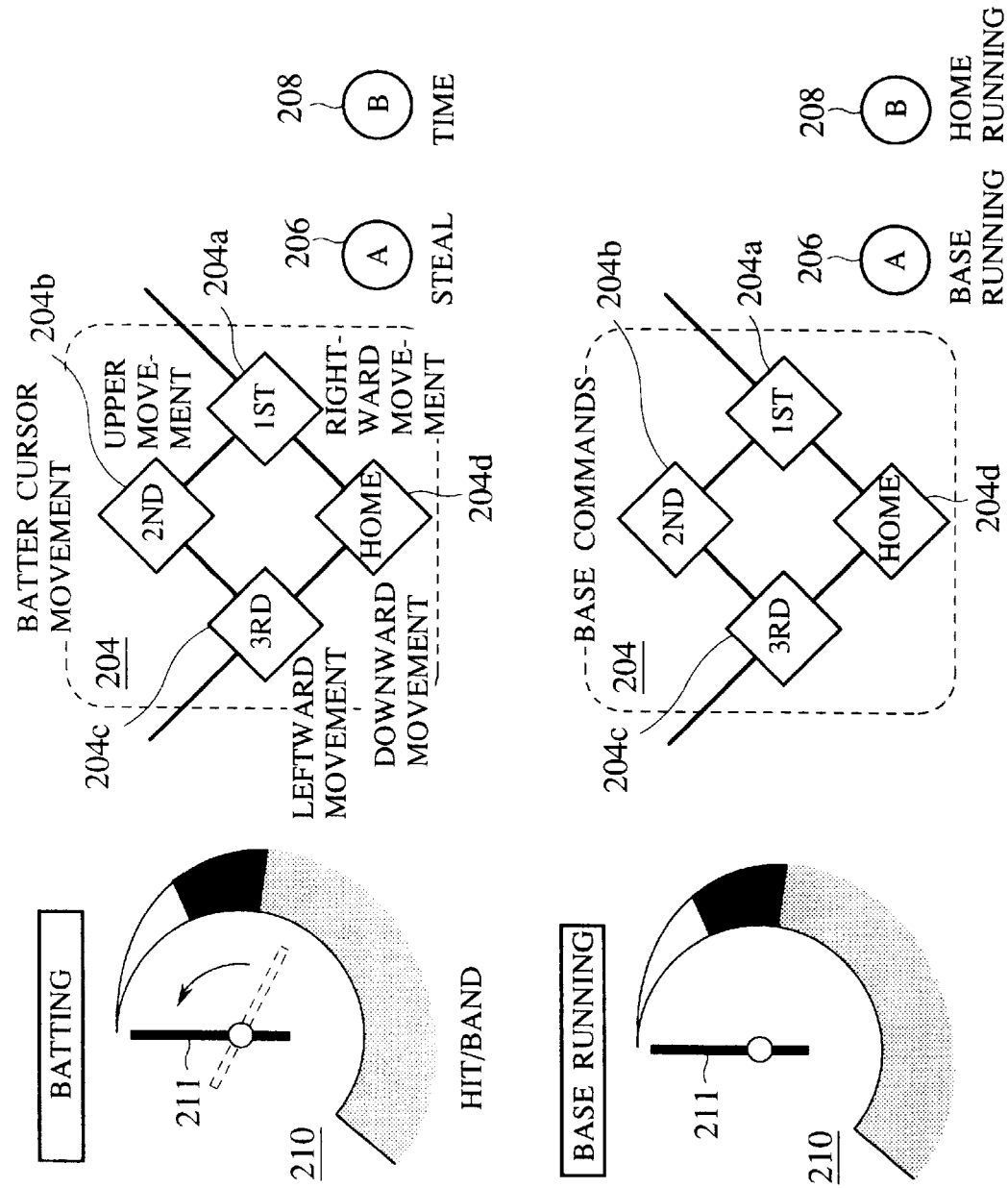
FIGS. 4A and 4B are explanatory views of operations of a player on offense in the game device according to the first embodiment of the present invention.

On batting, as shown in FIG. 4A, the buttons of the two sets 204 are used as direction keys to move the batting cursor. The first base button 204a is a rightward button, the second base button 204b is an upward button, the third base button 204c is a leftward button, and the home base button 204d is a downward button. A batting force is commanded by the bat-shaped switch 210.

A batting force is commanded by a swing angle of the bat 211 of the bat-shaped switch 210. When a swing angle of the bat 211 is below about 90°, a bunt is made. By changing a swing angle within this range, a bunting force can be subtly adjusted. When a swing angle of the bat 211 is larger than about 90°, a swing is made. By changing a swing angle, a swing force can be adjusted. When a swing angle is above 180°, a forceful full swing is made. From 90° to about 150° meet battings, such as inside-out swings, are made.

A steal is commanded by the left decision button 206, and a time is commanded by the right decision button 208.

As shown in FIG. 4A, in base running, a base for an advance or the home base for a homing are commanded by the diamond-layout sets 204. By pressing one of the base-shaped buttons 204a–204d of the diamond-layout set 204, a base is directly commanded. An advance is commanded by the left decision button 206, and a homing is commanded by the right decision button 206. For example, by pressing the third base button 204c and the left decision button 206, an advance to the third base is commanded. Even when a game display is changed from a display as viewed on the catcher side to a display as viewed on the outfield side, a direct command is possible irrespective of a display. The bat-shaped switch 210 is not used.

Next, the method of operating the bat-shaped switches 210 will be detailed with reference to FIG. 5.

As described above, the game players use the associated bat-shaped switches 210 when the players are on offense to bat. The bat-shaped switches 210 are operated to cause a batter to have various motions. When the game player on offense operates the bat-shaped switch on a baseball player introduction display or a bisected display, the bats of the baseball players on the display are moved in accordance with a motion of the bat-shaped switch, and the respective baseball players make a shadow swing. It is possible that the respective baseball players have shadow swings different from each other to give the game a diversity. A common shadow swing for the respective baseball players will be explained.

Figure 5A:
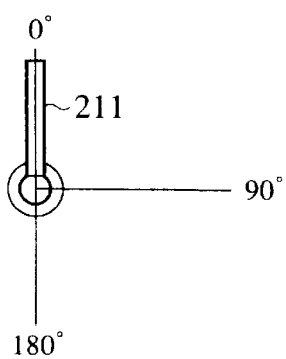
FIGS. 5A to 5H are explanatory views of operations of the bat-shaped switches of the game device according to the first embodiment of the present invention.

As shown in FIG. 5A, when the bat-shaped switch 210 is not moved at all, the batter in the display undoes a grip, assuming a relaxed posture.

Figure 5B:
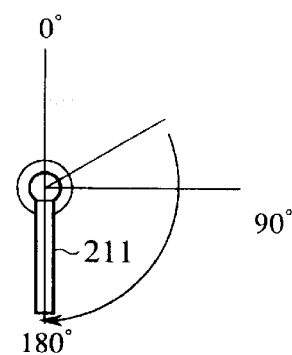

As shown in FIG. 5B, when the bat 211 of the bat-shaped switch 210 is turned clockwise to pass the point of, e.g., 75°, a motion of the bat of the batter in the display is interlocked with a motion of the bat 211. Until an angle of the bat 22 reaches 180°, the batter makes a light shadow swing.

Figure 5C:
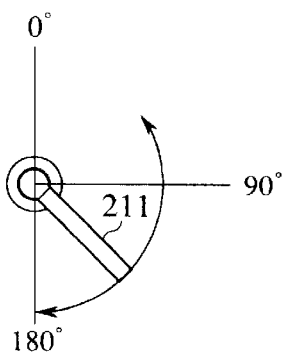

Then, as shown in FIG. 5C, when the bat 211 of the bat-shaped switch 210 is moved between 75° and 179°, the batter in the display makes the light shadow swing in accordance with a motion of the bat-shaped switch 210. When the bat 211 is stopped, the batter in the display undoes the grip at the same position.

When the game player leaves the bat 211 from the hand at a position to which the game player has rotated the bat 211 of the bat-shaped switch 210, the batter in the display assumes a batting motion which is varied in accordance with an operation of the bat 211 by the game player.

Figure 5D:
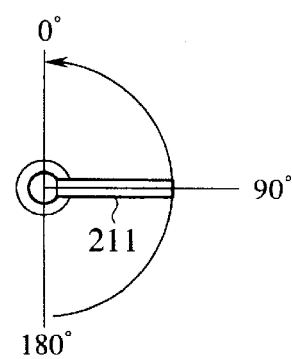
Figure 5E:
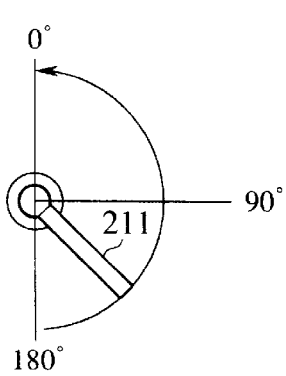

As exemplified in FIG. 5D, when the game player rotates the bat 211 of the bat-shaped switch 210 to the point of 180° and leaves the bat 211 from the hand, the batter in the display assumes a full swing. As shown in FIG. 5E, when the game player leaves the bat 211 of the bat-shaped switch 210 at a position between 70° and 179°, the batter in the display shifts the shallow swing to a full swing. By changing an angular position of the bat 211, a batting force can be changed.

Figure 5F:
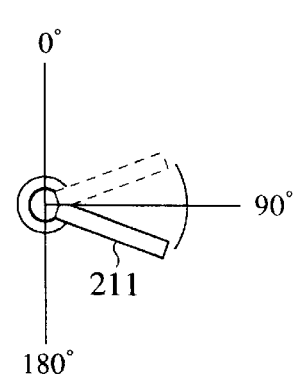

As shown in FIG. 5F, when the bat 211 of the bat-shaped switch 210 is stopped between 75° and 105° for a certain period of time, e.g., 30 game display frames (1 second) or more frames, a bunt mode is obtained, and the batter in the display bunts. In this state, when the bat 211 is rotated further from 105°, the batter in the display makes the shadow batting, and shifts the shadow batting to the batting motion when the game player leaves the bat 211 from the hand.

Figure 5G:
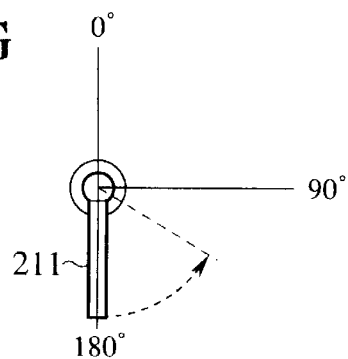
Figure 5H:
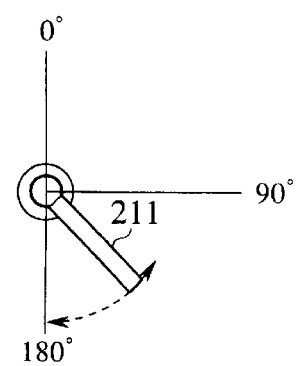

In the present embodiment, an initial speed of the bat 211 of the bat-shaped switch 210 is detected, and, as shown in FIG. 5G, when an initial speed exceeds a certain value, a batting motion of swinging the bat of a batter is made. However, in guiding a start of a batting motion, simply based on an initial speed, only a little loosening the bat 211 of the bat-shaped switch 210 often causes a swing at a speed beyond a prescribed initial speed. In view of this, in the present embodiment, as shown in FIG. 5H, even when an initial speed of the bat 211 is above a certain value, unless the bat 211 passes a position of 90° within 6 frames (0.2 seconds), for example, the shadow swing is shifted to a half swing.

When the bat 211 of the bat-shaped switch 210 is stopped on the way to a full swing, a half swing motion is thus made. Thus, commands which make game players feel as if they were actually batting.

Now, the image display method used in the baseball game device according to the present embodiment will be explained with reference to FIGS. 5 to 11.

Figure 6:
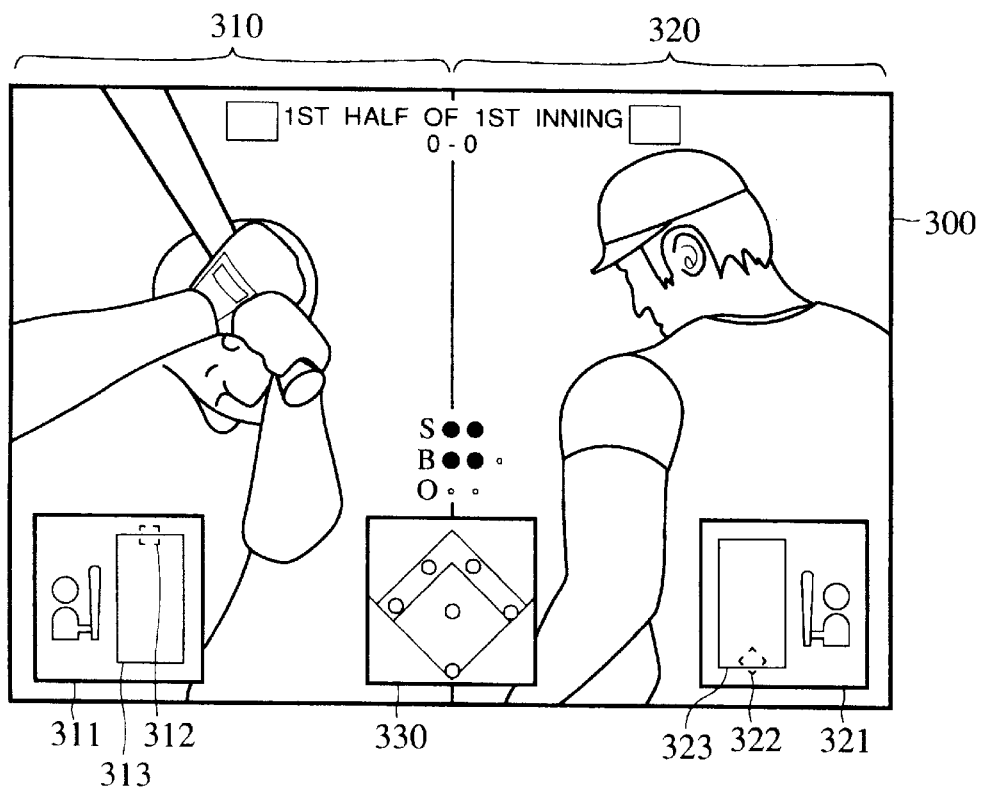
FIG. 6 is views of game displays of pitching and batting in the game device according to the first embodiment of the present invention.

FIG. 6 is a game screen 300 for pitching and batting. The game screen is bisected in a left and a right screens. The offense uses the left screen 310, and the defense uses the right screen 320.

A smaller screen 311 for commanding a batting position is provided on the offense's left screen. A strike zone 313 is displayed on the batting position display screen 311. On the offense's screen 310 a game character to be currently operated by a game player on offense, i.e., a batter, is displayed.

Similarly thereto, also on the defense's right screen 320, a smaller screen 321 for commanding a pitching position is provided. The strike zone 323 is also displayed on the defense's smaller screen 320. On the defense's screen 320 a game character to be currently operated by a game player on offense, i.e., a pitcher, is displayed.

Between the offense's screen 310 and the defense's screen 320 there is provided a radar screen 330 for displaying the diamond to display a proceeding of the baseball game.

The game player on defense freely shifts a batting position up-to-down and left-to-right as shown in FIG. 3A, confirming a posture of the game character (pitcher) on the defense's screen 320 shown in FIG. 6 and watching the pitching position display screen 321 on the defense's screen 320. When a pitching position is shifted, the pitcher cursor 322 on the pitching position display screen 321 is shifted. The player commands an intended position, watching the strike zone 323 and the pitcher cursor 322.

The player on offense freely shifts a batting position up-to-down and left-to-right by the diamond-layout set 204 as show in FIG. 3B, confirming a posture of the game character (batter) in the offense's screen 310 shown in FIG. 6 and watching the batting position display screen 311 on the offense's screen 310. When a batting position is shifted, the batter cursor 312 on the batting position display screen 211 is moved. The player swings the bat 211 of the bat-shaped switch 210 for an intended force, and operates the diamond-layout set 204 to command an intended position, watching the strike zone 313 and the batter cursor 312.

When the players exchange the defense and the offense, the offense screen 310 and the defense screen 320 are replaced by each other to facilitate the players' operation.

As described above, a game player on offense, and a game player on defense input a batting position and a pitching position on one and the same display, the display is divided in an offense display 310 and a defense display 320 as shown in FIG. 6, which enables the game players to be concentrated on their own input operations and makes it difficult for the game players to see operational contents of each other, whereby tactics of the baseball game can be amusing.

Figure 7:
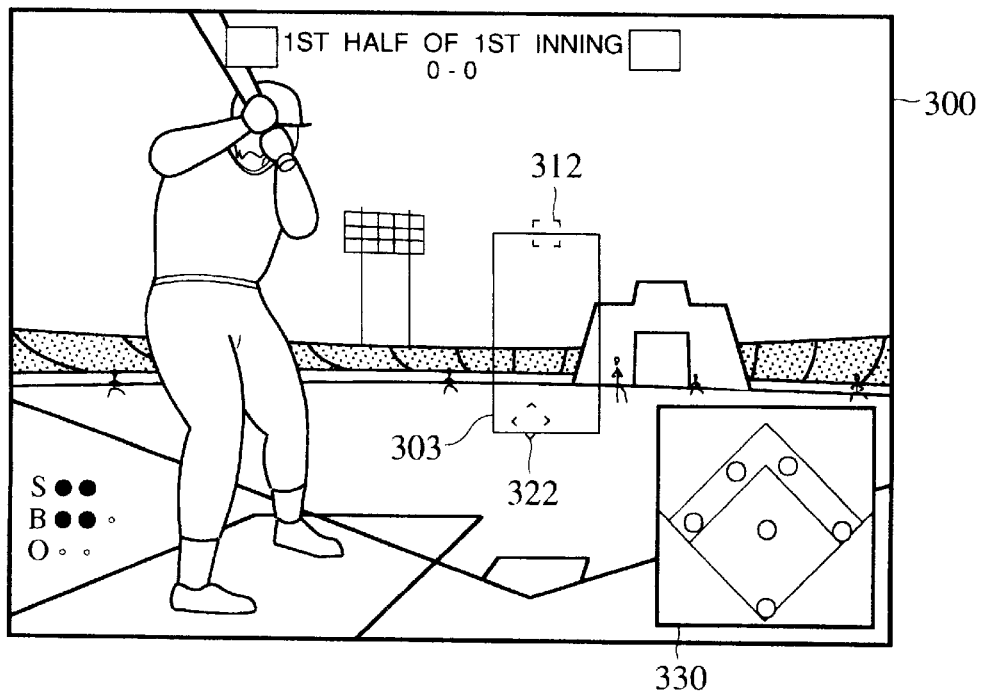
FIG. 7 is a view of a game display of pitching in the game device according to the first embodiment of the present invention.

FIG. 7 shows the game screen 300 of a batting. When the player on defense presses the decision button 206, the pitcher starts pitching motion, and as shown in FIG. 6, the offense's screen 310 and the defense's screen 320 are unified. On the unified game screen 300 the strike zone 303 is unified. The radar screen 330 is moved to a lower right position.

Figure 8:
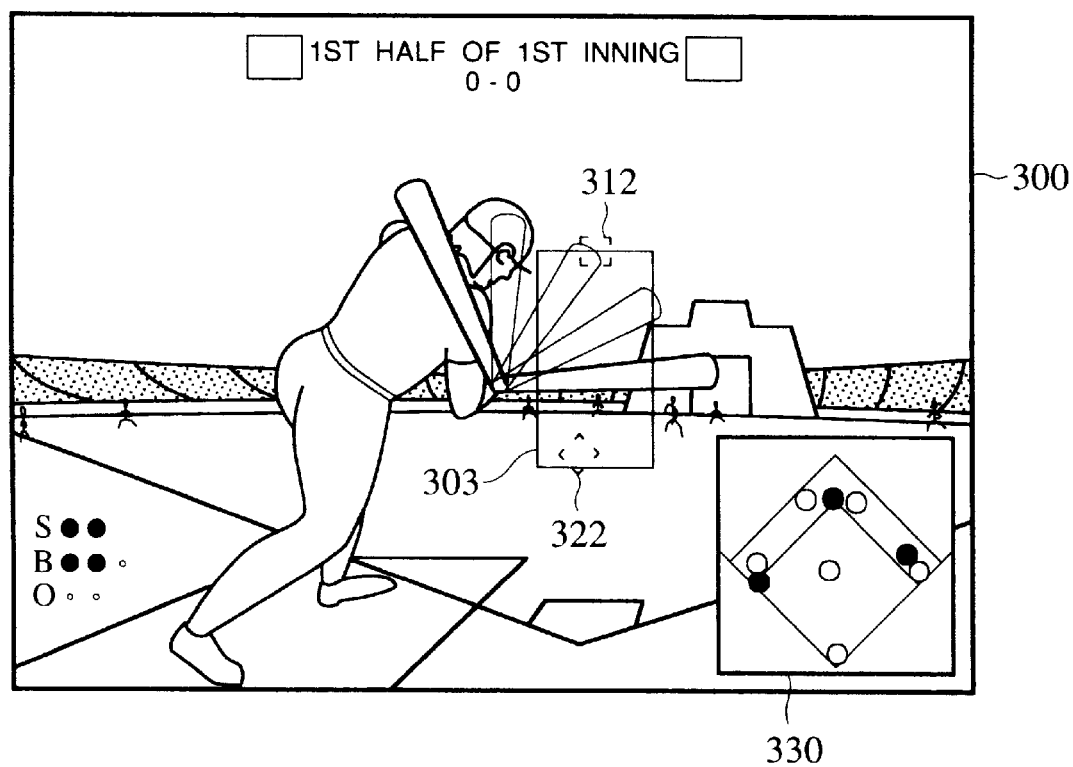
FIG. 8 is a view of a game display of batting in the game device according to the first embodiment of the present invention.

FIG. 8 shows the game screen for a batting. When the player on offense leaves the bat 211 of the bat-shaped switch 210, the batting is conducted at an intended batting position with an intended batting force. In FIG. 8, after images of the bat are shown so that the batting can look realistic.

Then, with reference to the game displays of FIGS. 6 to 8 processing of the pitching and the batting which start from a pitching setting and a batting setting will be explained in accordance with the flow charts of FIGS. 9 and 10.

Figure 9:
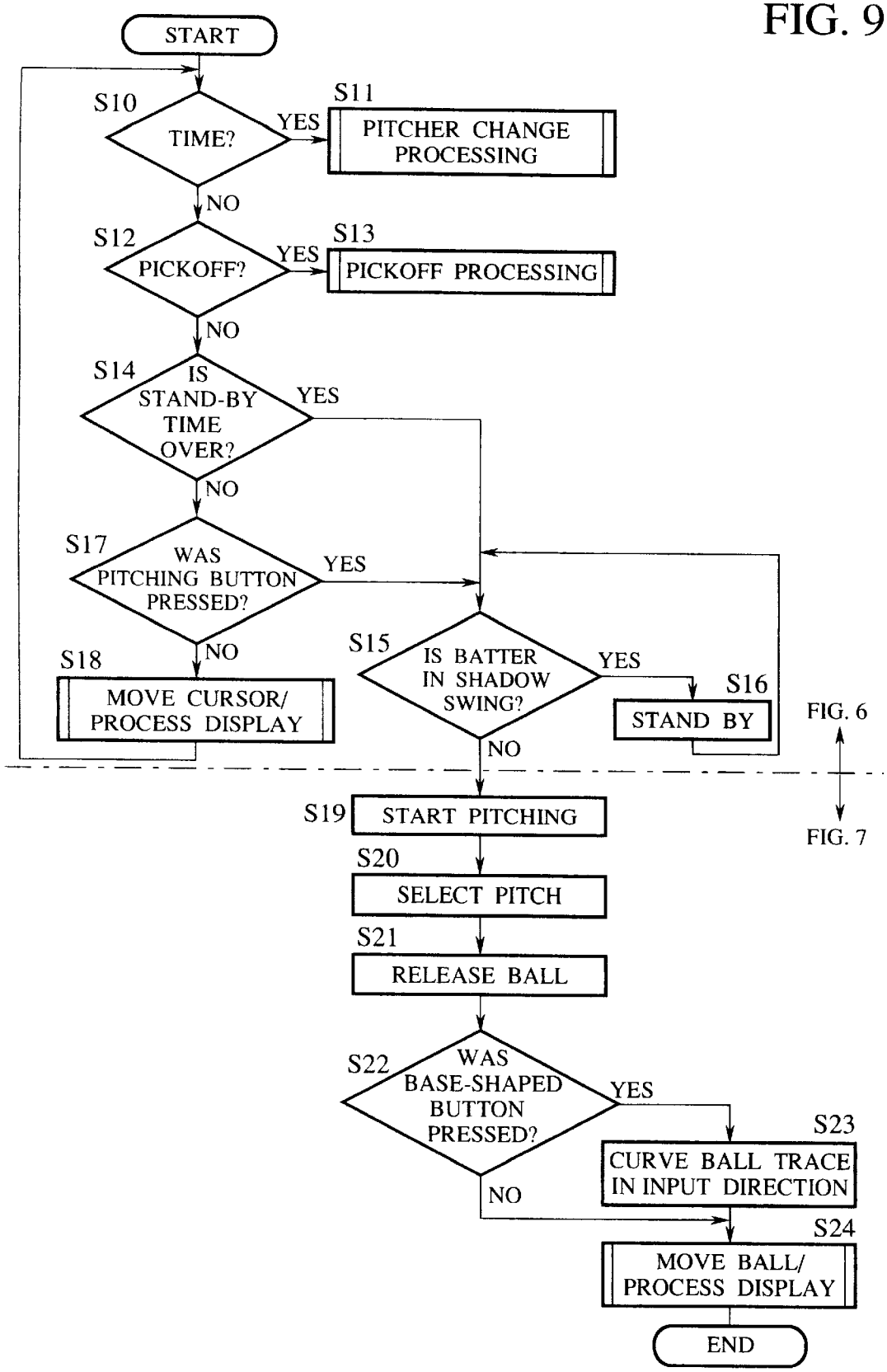
FIG. 9 is a flow chart of a pitching setting, and processing procedures of pitching in the game device according to the present embodiment.

FIG. 9 is a flow chart of processing procedures by a game player operating a pitcher.

The processing by a game player operating a pitcher is started on the bisected pitching and the batting screens. First, it is judged whether or not a time is commanded by a game player operating the pitcher (Step S10). When a time has been commanded, pitcher change processing is conducted (Step S11).

When no time has been commanded, it is judged whether or not the game player operating the pitcher has commanded a pick-off ball (Step S12). When a pick-off ball has been commanded, the display is shifted to a pick-off ball display (not shown) to process judgement of a pick-off ball, etc. (Step S13).

When no command for a pick-off ball has been made, it is judged whether or not a stand-by time for a command of the game player operating the pitcher is judged (Step S14). When the stand-by time is over, it is judged whether or not a batter is in shadow batting in accordance with a command by a game player operating a batter (Step S15). When the batter is in shadow batting, again Step S15 follows after a prescribed period of time has passed (Step S16).

When the stand-by time is not over, it is judged whether or not the game player operating the pitcher has pressed a pitching button 206, i.e., whether or not a pitching motion has been started (Step S17). When the pitching button 206 has not been pushed, an operation of the diamond-layout set 204 as the direction keys operated by the game player operating the pitcher is detected, and based on the detected operation, the pitcher cursor 322 indicating a pitching position is moved to display the pitching position on the pitching position display screen 321 (Step S18).

When the game player operating the pitcher has pushed the pitching button 206, Step S18 is followed by Step S15, and unless the pitcher is in shadow batting (Step S15), the pitching operation is started (Step S10).

The bisected pitching and batting screen of FIG. 6, which is divided for the game player operating the pitcher and for the game player operating the batter, is used until a pitching motion is started, i.e., from Step S10 to Step S18. When the pitching motion is started in Step S19, the bisected pitching and batting screens of FIG. 6 is replaced by a single pitching display of FIG. 7.

The game player operating the pitcher can select by the diamond-layout set 204 a pitch from a time when the pitcher has started a pitching motion (Step S19) to a time when the ball leaves the pitcher's hand. A pitch, such as straight, curve, slider, sinker, fork or others, is selected by pressing one of the base-shaped buttons 204a–204d of the diamond-layout set 204 or combination thereof.

When the game player operating the pitcher operates the diamond-layout set 204 after the ball has left the pitcher's hand, a trace of the pitched ball can be curved (Steps S22 and S23). After Step S21, it is judged whether or not one of the base-shaped buttons 204a–204d of the set 204 has been pressed (Step S22). When one of the base-shaped buttons 204a–204d has been pressed, the ball is moved and displayed (Step S24) so that a trace of the ball is curved in the inputted direction (Step S23). Unless the base-shaped buttons 204a–204d have been pressed, the ball is moved and displayed without being curved (Step S24).

Figure 10:
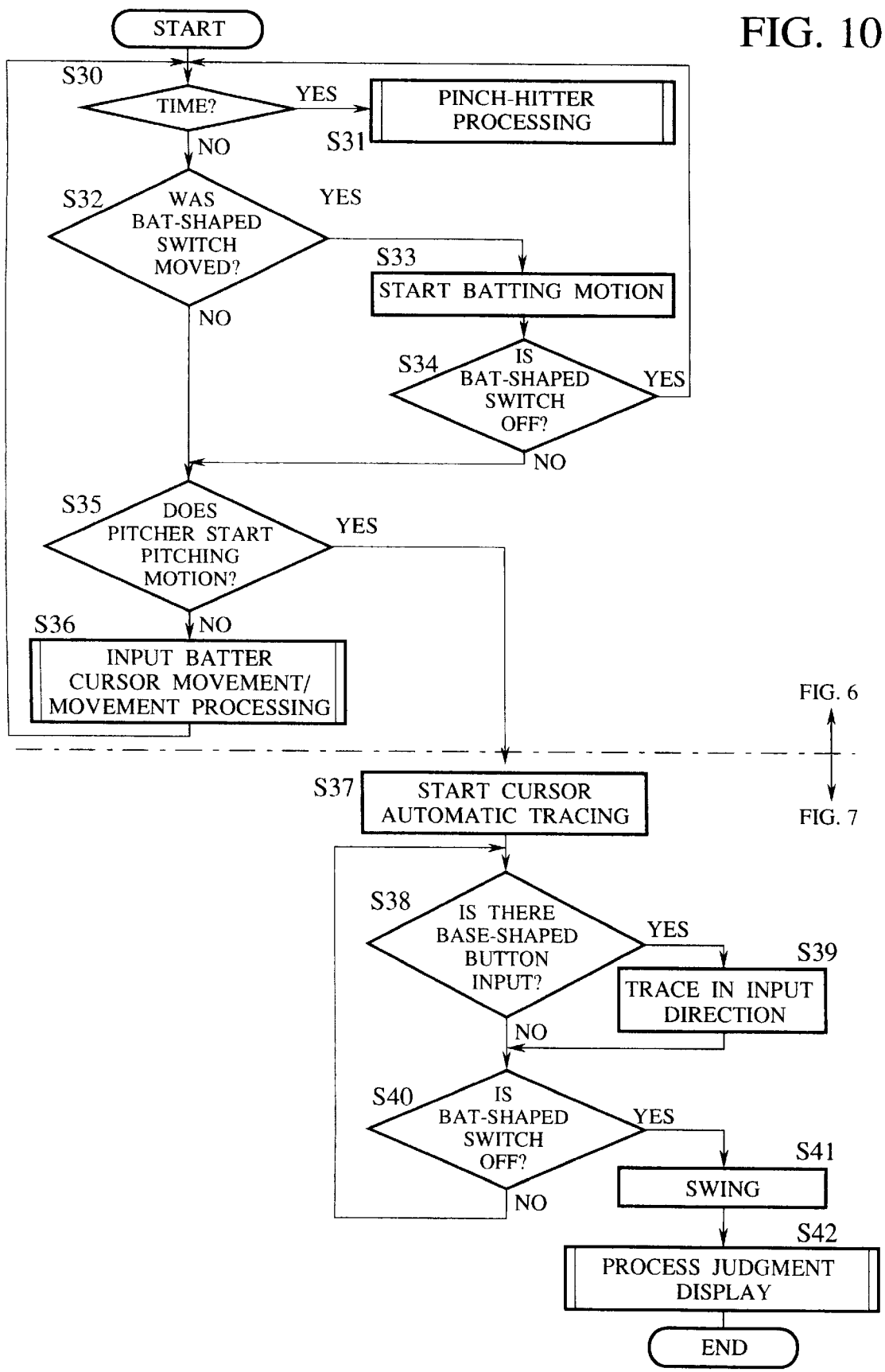
FIG. 10 is a flow chart of a batting setting, and processing procedures of pitching in the game device according to the present embodiment.

FIG. 10 shows a flow chart of processing procedures by a game player operating a batter.

The processing by a game player operating a batter is started on the bisected pitching and the batting screens. First, it is judged whether or not a time is commanded by a game player operating the batter (Step S30). When a time has been commanded, pinch-hitter processing is conducted (Step S31).

Unless a time has been commanded, it is judged whether or not the game player operating the batter has operated the bat-shaped switch 211 (Step S32). When the bat-shaped switch 211 has been operated, the batter starts to be ready for batting (Step S33). Then, it is detected whether or not the bat-shaped switch 211 is off (Step S34). When the bat-shaped switch 211 is off, Step S30 follows.

In Step S32, when it is judged that the bat-shaped switch 211 has not been operated, and in Step S34 when the bat-shaped switch 211 is not off, it is judged whether or not the game player operating the pitcher has started a pitching motion by the pitcher (Step S35). Unless the game player operating the pitcher has started the pitching motion, an operation of the diamond-layout set 204 by the game player operating the batter as the direction keys is detected, and the batter cursor 312 indicating a batting position is moved based on the detected operation, and the batting position is displayed on the batting position display screen 311 of FIG. 6 (Step S36). When the game player operating the pitcher pressed the pitching button 206 to start pitching, Step S37 follows.

The bisected pitching and batting screen of FIG. 6, which is divided for the game player operating the pitcher and for the game player operating the batter, is used until a motion is started, i.e., from Step S10 to Step S18. When the pitching motion is started in Step S19, the bisected pitching and batting screens of FIG. 6 is replaced by a single pitching display of FIG. 7.

In Step S37 processing for the batter cursor 312 automatically following the pitcher cursor 322 is started. A following speed depends on the batter's ability. The game player operating the batter can control a following direction and a speed of the batter cursor 312 by operating the diamond-layout set 204 even after the pitcher has started a pitching motion, and the ball has left the hand of the pitcher. After Step S37, it is judged whether or not one of the base-shaped buttons 204a–204d of the set 204 has been pressed (Step S38). When one of the base-shaped buttons 204a–204d has been pressed, the batter cursor 312 is moved in the inputted direction to follow the pitcher cursor 322.

Then, it is judged whether or not the bat-shaped switch has been turned off (Step S40). When the bat-shaped switch 210 of the game player operating the batter has been turned off, the batting operation by the bat-shaped switch 210 is over, and a swing motion as shown in FIG. 8 is made (Step S41), and next batting judgement display is conducted (Step S42). When the bat-shaped switch 210 has not been turned off in Step S40, Step S38 follows to repeat the processing from Step S38 to Step 40.

After Step S42, processing is conducted by a program conforming the actual baseball game rules. For example, when the batter swings and misses, the ball is returned to the pitcher and the processing is conducted based on flow charts shown in FIGS. 9 and 10. When the batter is struck out, displays in which the batter is changed to next batter are conducted, and thereafter the processing is conducted based on flow charts shown in FIGS. 9 and 10. When the third out is completed, the game players are changed between batting and fielding, and thereafter the processing is conducted based on flow charts shown in FIGS. 9 and 10.

Now, display on the radar screen 330 will be explained with reference to FIGS. 11 to 13.

Figure 11:
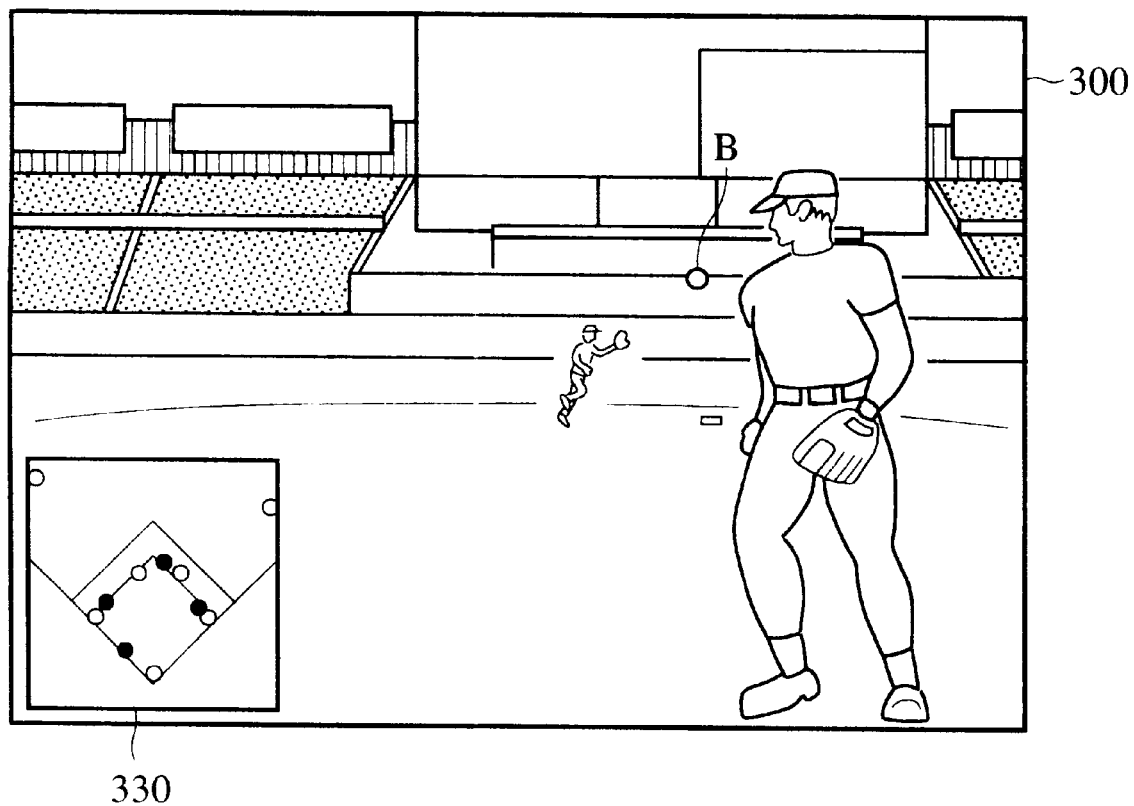
FIG. 11 is a view of a game display of defense in the game device according to the first embodiment of the present invention (Part 1).
Figure 12:
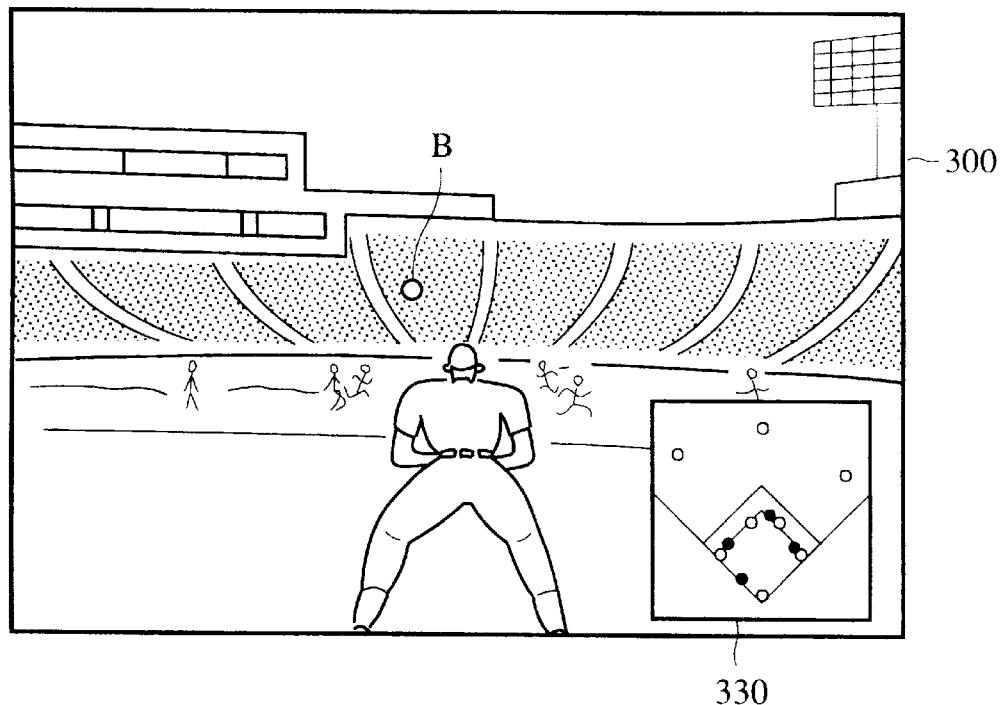
FIG. 12 is a view of a game display of defense in the game device according to the first embodiment of the present invention (Part 2).
Figure 13:
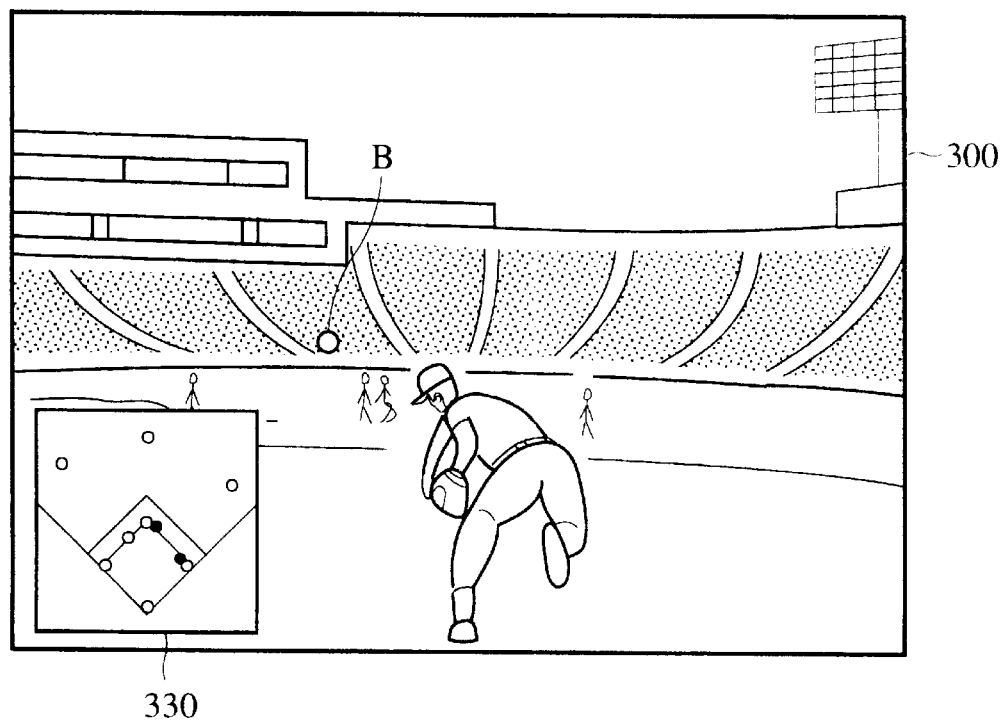
FIG. 13 is a view of a game display of defense in the game device according to the first embodiment of the present invention (Part 3).

When a batter hits, and the ball is hit to the field, on the game screen 300 the display shown in FIG. 8 as viewed at the offense view point is moved, following the ball as shown in FIG. 11, and immediately before an outfielder catches the ball, the display is changed to displays as viewed at the back of the outfielder, at the defense view point as shown in FIGS. 12 and 13. At this time, the radar screen 330 is enlarged or diminished in accordance with positions of a ball with reference to the home base as the standard. When a hit distance of a hit ball is short, the view point is not moved, and a display of the outfielder as viewed at the front, at the same view point without moving the view point to the back of the outfielder.

In FIG. 8 the game proceeds only in the infield, and the radar screen 330 displays an enlarged view of the infield alone. In this state, when a ball is hit to the outfield, the view point is raised so as to contain the flying hit ball, the display being gradually diminished. In FIG. 11 the display is as viewed at a view point containing parts of the infield and the outfield and is diminished in comparison with that of FIG. 8. In FIG. 12, the display is further diminished in comparison with that of FIG. 11 at the view point containing the entire infield and outfield. That is, the radar screen 330 displays diminished images by zooming at the raised view points from that in FIG. 8 to that in FIG. 11 and to that in FIG. 12.

Oppositely thereto, when a ball is returned from the outfield to the home base, the radar screen 330 displays the enlarged images with reference to the home base as the standard from the image of FIG. 12 containing the entire infield and outfield, to the enlarged image of FIG. 11 containing parts of the infield and the outfield, and finally to the further enlarged image of FIG. 8 containing the infield alone. That is, the radar screen 330 displays enlarged images by zooming at the lowered view points from that of FIG. 12, to that of FIG. 11 and to that of FIG. 8.

Now, the operation and image display on defense will be explained with reference to FIGS. 12 and 13.

In the present embodiment, corresponding to proceedings of the game, the display on the game screen 300 shown in FIG. 8, which is viewed at the offense side view point, and the displays on the game screen 300 shown in FIGS. 11, 12 and 13, which are viewed at the defense side view point are changed. Even when a display on the game screen 300 is thus changed, in the present embodiment, a base for a ball to be thrown to can be directly commanded by the use of one base-shaped buttons 204a–204d of the set 204, and accordingly operation commands are never confused. For example, in FIG. 12 the game player on defense presses the home base button 204d as shown in FIG. 3B in connection with the outfielder who has caught the ball in FIG. 12, this outfielder throws the ball to the home base as shown in FIG. 13.

Figure 14:
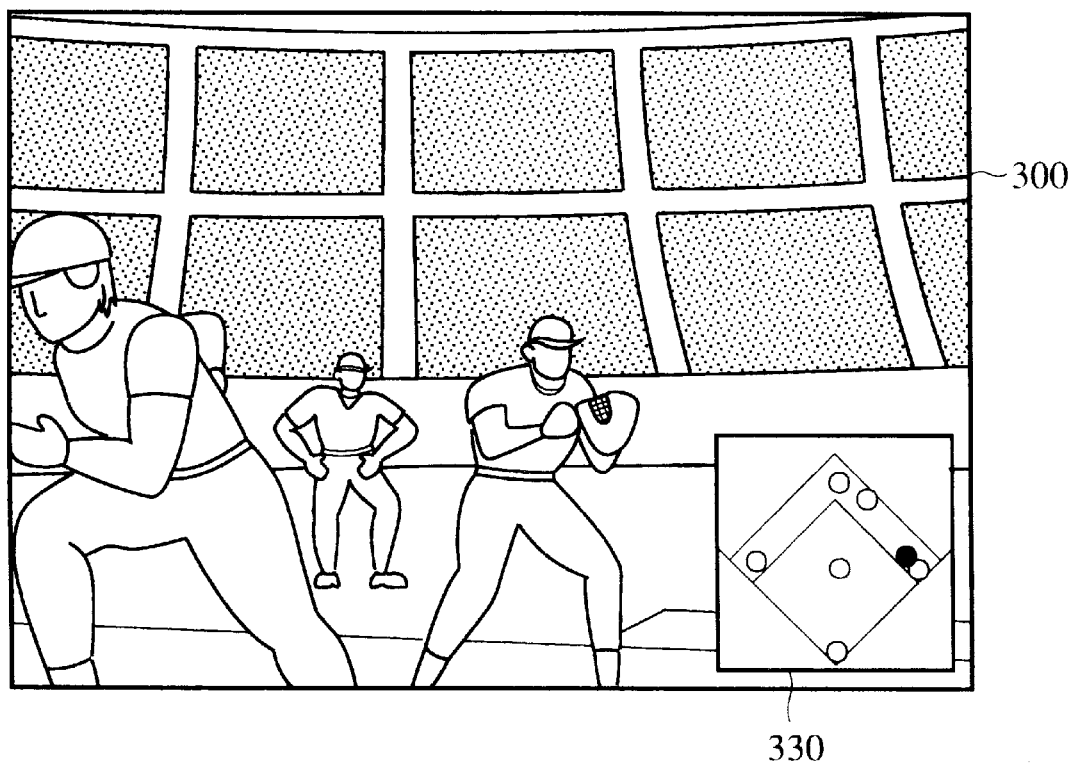
FIG. 14 is a view of a game display of a base running in the game device according to the first embodiment of the present invention.

Next, the operation and image display of base-run will be explained with reference to FIG. 14.

In the present embodiment, various image displays are possible at different view point corresponding to proceedings of the game. FIG. 14 is an image in which a runner is advancing from the first base to the second base, and the runner advancing from the first base to the second base is viewed at a view point inside the infield. When the player on offense presses the advance decision button 206, pressing the second base button 204b as shown in FIG. 4B, the on-first base runner advances to the second base. To make displays for the players to easily see proceedings of the game, in the present embodiment, view points are thus changed, and accordingly a relationship between the left and right sides of the screen, and the stadium is changed. However, an advance command to a runner is made only by pressing the base-shaped button 204b, and it is not necessary to consider a display on the screen. Accordingly, prompt commands can be made without confusion.

Now, ball display in the game displays will be explained with reference to FIGS. 11 to 13.

In a baseball game it is very important to the offense and the defense where the ball is presently located. The respective game players operate the game, watching locations of the ball. In the present embodiment, to facilitate watching locations of the ball, the ball B is displayed larger. As shown in FIGS. 11 to 13, the ball B is displayed in a size corresponding to that of a volley ball or a basket ball in comparison with the size of the baseball player. The ball B displayed in a size corresponding to that of a baseball ball is difficult to confirm locations of the ball in game displays. Especially to display a large range as shown in FIGS. 11 to 13 it is preferable that a display size of the ball B is determined irrespective of a size of the fielders so as to be easily watched in game displays.

As described above, according to the present embodiment, the method comprises the step of dividing a display screen at a prescribed point of time of the game to individually display a game character to be operated by a game player on the display screen, whereby the game player can easily know operations which he should make in a match game. Further, intuitional commands for the baseball game can be given by pressing the sets of base-shaped buttons and bat-shaped switches. The baseball game can be controlled by the intuitional operational commands. Proceedings of the baseball game can be accurately displayed by changing view points of displays of the game screen and enlarging/diminishing the radar screen.

The present invention is not limited to the above-described embodiment and covers other various modification.

For example, the present invention is applied to a baseball game, but the present invention can be applied to any game scenes in sports games, for example, a game scene of a penalty kick in a soccer game, a game scene of a service in a tennis game, a game scene of a free throw in a basket ball game. The present invention can be also applied to any game scenes of all kinds of games, e.g. a simulation game, in which game players including a computer need simultaneously operate game characters to decide a result.

In the above-described embodiment, the bat-shaped switches are used, but batting commands can be given by other switches.

In the above-described embodiment, the sets of base-shaped buttons are provided by square base-shaped buttons, but it is not essential that the base-shaped buttons have another shape. For example, the home base may have the shape of the actual home base. The base-shaped buttons are not essentially square but may be round.

What is claimed is:

1. A display method for game displays in a match game comprising:
   dividing a display screen at a prescribed point of time of the game to individually display a single game character to be operated by a game player on the display screen which is divided, and permitting the game player to make an input to the single game character individually displayed on the divided display screen; and
   rejoining the divided display screen and displaying a motion of the single game character which is based on the input by the game player on the rejoined display screen.

2. A display method for game displays of a game which is advanced based on inputs by a plurality of match game players, comprising:
   dividing a display screen at a prescribed point of time of the game to individually display respective single game characters to be operated by the respective match game players on the display screen which is divided, and permitting the game players to make inputs to the respective single game characters; and
   rejoining the divided display screen and displaying motions of each of the respective game characters which are based on the inputs by the game players on the rejoined display screen.

3. A display method for game displays according to claim 2, wherein the divided display screen is rejoined after all the game players have made the inputs.

4. A display method for game displays for displaying on a display screen an image of a virtual game space obtained at a prescribed view point, the display method comprising:
   dividing the display screen at a prescribed point of time of a game to make an image of a single character-to-be-operated at respective points of view on the display screen, and permitting a game player to make an input to the single character-to-be-operated displayed on the divided display screen; and
   rejoining the divided display screen and displaying a motion of the single game character which is based on the input by the game player on the rejoined display screen at one view point.

5. A display method for game displays according to claim 4, wherein said one view point in the rejoining step is at a location different from that in the dividing step.

6. A display method for game displays according to claim 1, wherein the divided display screen is rejoined after a prescribed period of time.

7. A display method for game displays according to claim 2, wherein the divided display screen is rejoined after a prescribed period of time.

8. A display method for game displays according to claim 4, wherein the divided display screen is rejoined after a prescribed period of time.

9. A display method for game displays according to claim 1, wherein the rejoined display screen displays all the game characters to be operated by the game players.

10. A display method for game displays according to claim 2, wherein the rejoined display screen displays all the game characters to be operated by the game players.

11. A display method for game displays according to claim 4, wherein the rejoined display screen displays all the game characters to be operated by the game players.

12. A display method for game displays according to claim 1, wherein in the dividing step, displays for the respective game players deciding operations are provided on the respective divided display screens.

13. A display method for game displays according to claim 2, wherein in the dividing step, displays for the respective game players deciding operations are provided on the respective divided display screens.

14. A display method for game displays according to claim 4, wherein in the dividing step, displays for the respective game players deciding operations are provided on the respective divided display screens.

15. A display method for game displays of a sports game, comprising:
    dividing, when game characters to be operated by game players compete with each other, a display screen so as to display single respective game characters, and permitting the game players to make inputs to the single respective game characters; and
    rejoining the divided display screen and displaying the game characters moving based on the inputs by the game players on the rejoined display screen.

16. A display method for game displays according to claim 15, wherein in the rejoining step all the game characters moving based on the inputs by the game players are displayed on the rejoined display screen.

17. A display method for game displays of a baseball game which is advanced based on an operational signal of control means, comprising:
    providing two sub-screens on the game display screen;
    providing on one of the sub-screens a display indicating a strike zone, and a cursor display indicating a point along which a bat passes in the strike zone; and
    providing on the other of the sub-screens a display indicating the strike zone, and a cursor display indicating a point along which a ball passes in the strike zone.

18. A display method for game displays of a baseball game according to claim 17, further comprising:
    providing a display indicating a batter character on said one of the sub-screens; and
    providing a display indicating a pitcher character on the other of the sub-screens.

19. A display method for game displays of a baseball game which is advanced based on an operational signal of control means, comprising:
    providing two sub-screens on a game display screen;
    providing a display for selecting a batting position of one of the game players and a display of a character operated by said one of the game players on one of the sub-screens; and
    providing a display for selecting a pitching position of the other of the game players and a display of a character operated by the other of the game players on the other of the sub-screens.

20. A display method for game displays of a match game which is advanced based on an operational signal of control means, comprising:
    dividing a display screen to display respective information necessary for match game players to decide respective motions;
    standing by for a decision by the match game players of respective motions; and
    rejoining the divided display screen to display results of the motions on the display screen after the decision by the match game players is completed.

21. A display method for game displays of a match game which is advanced based on an operational signal of control means, comprising:
   providing on respective divided display screens displays for respective match game players deciding respective motions; and
   rejoining the divided display screens and displaying a result of the motions based on the decisions of the respective match game players on the rejoined display screen.

22. A display method for game displays of a match game according to claim 21, wherein
   the respective displays provided on the divided display screen include displays of characters operated by the respective match game players.

23. A storage medium storing a program for operating a control device to perform a method for displaying game displays in a match game, said method comprising the steps of:
   dividing a display screen at a prescribed point of time of the game to individually display a single game character to be operated by a game player on the display screen which is divided, and permitting the game player to make an input to the single game character; and
   rejoining the divided display screen and displaying a motion of the single game character which is based on the input by the game player on the rejoined display screen.

24. A storage medium storing a program for operating a control device to perform a method for displaying game displays in a match game, said method comprising the steps of:
   dividing, when game characters to be operated by game players compete with each other, a display screen so as to individually display single respective game characters, and permitting the game players to make inputs to the single respective game characters; and
   rejoining the divided display screen and displaying the game characters moving based on the inputs by the game players on the rejoined display screen.

25. The storage medium according to claim 24, wherein in the rejoining step all the game characters moving based on the inputs by the game players are displayed on the rejoined display screen.

26. A game device including a rotary switch which is rotated to input information, comprising:
   detection means for detecting a rotation range of the rotary switch; and
   control means for controlling a motion of a game character to be operated by a game player in accordance with the rotation range of the rotary switch.

27. A motion control method for a game character by the use of a rotary switch which is rotated to input information, comprising the steps of:
   detecting a rotation range of the rotary switch; and
   controlling a motion of the game character operated by the game player in accordance with the rotation range of the rotary switch.

28. A display method for game displays comprising:
   dividing a display screen into a plurality of display areas, each display area displaying a single game character to be operated by a respective game player and permitting the respective game player to make an input to the game character; and
   displaying motions of each game character, which are based on the input by each respective game player, on the display screen.

29. A display method for game displays of a match game which is operated by a plurality of match game players, comprising:
   dividing a display screen to individually display respective single game characters to be operated by the respective match game players, and permitting the match game players to make inputs to the respective single game characters displayed on the divided display screen; and
   displaying motions of each of the respective single game characters which are based on the inputs by the game players on the display screen.

30. A display method for game displays of a match game which is operated by two match game players, comprising:
   dividing a display screen into two display areas, respectively displaying a single offensive game character and a single defensive game character on the divided two display areas, and permitting one of the two match game players to make an input to the offensive game character and permitting the other of the two match game players to make an input to the defensive game character; and
   displaying motions of the offensive game character and the defensive game character which are based on the inputs by the two game players on the display screen.

31. A display method for game displays according to claim 30, further comprising switching displays of the offensive game character and the defensive game character between the two display areas when the offensive game player and the defensive game player alternate.

32. A display method for game displays comprising:
   when an offensive game character hits a ball, displaying the hit ball as viewed from an offensive view point which is moved so as to follow the ball; and
   before a defensive game player tries to catch the ball, changing the offensive view point into a defensive view point to display the ball as viewed from the back of the defensive game player.

* * * * *